Sept. 21, 1943.   P. L. DOODCHENKO   2,330,034
INSECT EXTERMINATOR
Filed May 23, 1941
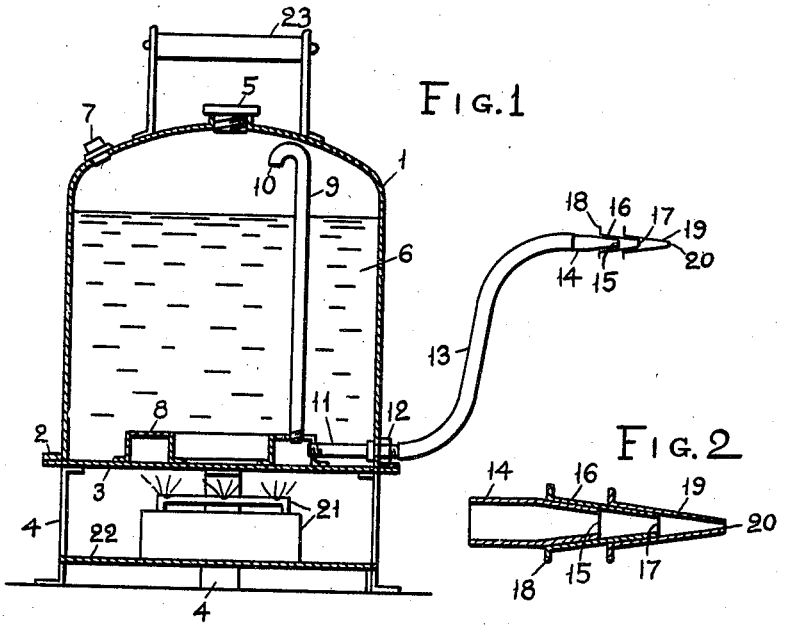
PETER L. DOODCHENKO
INVENTOR.
BY John P. Wironow
ATTORNEY Patented Sept. 21, 1943

2,330,034

UNITED STATES PATENT OFFICE 2,330,034

INSECT EXTERMINATOR

Peter L. Doodchenko, New York, N. Y.

Application May 23, 1941, Serial No. 394,745

1 Claim. (Cl. 122—460)

My invention relates to insect exterminators and has particular reference to exterminators employing hot vapors or steam.

My invention has for its object to provide a device for producing superheated steam and for directing a jet of such steam into places where insect life may be found.

I prefer to use steam in my device in preference to chemical liquids or vapors for the reason that the use of such chemicals in living quarters is objectionable on account of their disagreeable and persistent odor, effect on furniture, walls, clothing, etc., and also the fact that the chemicals do not always reach the insect life protected by layers of dirt, insect eggs with hard, waxy shells, etc.

Steam has an important advantage over chemicals in that it does not as a rule affect the objects being sprayed; also that its heat penetrates protective layers and destroys insect life in the egg state. Ordinary steam is not fully effective, since many forms of insect life, including, for instance, lice, bedbugs, etc., survive for a short period heat reaching temperature of boiling water or 100° centigrade. Certain bacteria survive temperatures over 120° centigrade, but they perish when temperature reaches 125° centigrade. I have found, therefore, that steam must be superheated to a temperature of at least 125° centigrade in order to be fully effective against all forms of insect life and germs.

My invention is more fully described in the accompanying specification and drawing, in which:

Fig. 1 is a sectional elevational view of my exterminator;

Fig. 2 is an enlarged detail view of an adjustable spraying nozzle used with my exterminator.

My exterminator as shown in Figs. 1 and 2 consists of a vessel or boiler 1 closed at the top and having a flange 2 at the bottom attached to a bottom plate 3. The boiler is supported on legs 4. A filling hole is provided at the top for a screw plug 5, the hole being used for placing water 6 in the boiler or other liquid for generating steam or vapor. A safety valve 7 of an ordinary construction may be provided to limit the pressure in the boiler. A superheater is provided at the bottom of the boiler in the form of an annular container 8 open at the bottom and welded or otherwise attached to the bottom plate 3, the latter serving as the bottom wall of the container. A steam pipe 9 extends from the container to the top of the boiler or to its steam space, the upper end of the pipe being bent downward at 10 to prevent any large drops of the liquid from falling into the pipe.

An exhaust pipe 11 extends from the container 8, passing through the side wall of the boiler where it is fastened by a nut 12 with a suitable steam-proof gasket. A flexible hose 13 is attached at one end to the exposed end of the pipe 11 and has a spraying nozzle at the free end. The nozzle, as is shown in detail in Fig. 2, consists of an inner nozzle 14 having a tapering or frusto-conical end with a relatively large opening 15. A second nozzle 16 is frictionally fitted on the inner nozzle and has a smaller opening 17 at the end. A flange 18 may be provided to facilitate mounting and removal of the nozzle. A third nozzle 19 may be also provided with a still smaller opening 20. The largest opening is obtained by removing all other nozzles from the inner nozzle, the smallest opening being obtained by placing all the nozzles as shown. Three nozzles are shown by way of illustration, but it is understood that any desired number of such nozzles may be provided.

A burner 21 is supported under the boiler on a plate 22. The burner may be of any suitable type, for a liquid or gaseous fuel, or electric if preferred. The burner is so made as to provide a wide heating area in order to heat the bottom plate 3 where it contacts water in the boiler and also the dry portions of the plate under the container 8 for superheating the steam. The desired temperature of the superheated steam at the nozzle may be obtained by adjusting the safety valve 7 and the size of the flame of the burner.

A handle 23 is provided at the top of the boiler for carrying the latter from one place to another for spraying infected places.

I have found that superheated steam represents an ideal medium for exterminating insect life without causing any inconvenience to inhabitants of the room where it is used and without spoiling in any way wall paper, furniture, metal, fabrics, etc.

A thin jet of superheated steam substantially retains its temperature at a distance of a few inches from the nozzle. Allowance, of course, can be made for a certain drop if a long jet is used. Such a jet is very effective for destroying all kinds of insect life including larvae, eggs, etc., even if they are hidden under paper or fabric. The steam jet can be also used for sterilizing various objects, the high temperature being generally lethal to various germs.

It is understood that my insect exterminators may be further modified without departing from the spirit of the invention, as set forth in the appended claim.

I claim as my invention:

An insect exterminator comprising a boiler adapted to contain a liquid, means to heat the bottom wall of the boiler, an annular container inside the boiler attached to the bottom wall, a pipe extending from the container to the top of the boiler for admitting steam into the container, and a pipe extending to the outside for delivering the superheated steam.

PETER L. DOODCHENKO.